United States Patent [19]

Nicolodi

[11] 4,426,894
[45] Jan. 24, 1984

[54] AUTOMATIC SAW SWAGE

[76] Inventor: Gerald L. Nicolodi, 3150 Bailey Rd., Mulberry, Fla. 33860

[21] Appl. No.: 316,735

[22] Filed: Oct. 30, 1981

[51] Int. Cl.³ .......................................... B23D 63/06
[52] U.S. Cl. ...................................... 76/54; 76/75
[58] Field of Search .............. 76/51, 52, 54, 53, 75, 76/76

[56] References Cited

U.S. PATENT DOCUMENTS 983,427  2/1911  Carroll .................................. 76/54
2,800,039  7/1957  Vollmer ............................... 76/54

Primary Examiner—Roscoe V. Parker
Attorney, Agent, or Firm—Stefan Stein

[57] ABSTRACT

An automatic swage machine is disclosed which includes an indexing mechanism for indexing a saw along a table enabling a swaging mechanism to sequentially swage each tooth of the saw. The indexing mechanism includes a pair of magnets connected to an indexing arm for pulling the saw forwardly and then move the saw rearwardly enabling the next tooth to be swaged to engage the swaging mechanism.

8 Claims, 7 Drawing Figures

AUTOMATIC SAW SWAGE

BACKGROUND OF THE INVENTION

This invention relates to swaging machines; more particularly, this invention relates to automatic swaging machines which sequentially swage each tooth of a saw such as a band saw.

Presently there exist many types of swage machines designed to swage the saw teeth and the like. The simplest type of swage machine is a manual device which comprises a swage assembly having an anvil and an eccentric die positioned within a housing. A pair of clamp screws are positioned on opposing sides of the housing so as to grasp the saw to be swaged. A clamp lever is operatively connected to the clamp screws to enable the operator to rotate the screws thereby clamping the saw. Another lever, commonly referred to as a die lever, is operatively connected to the die to rotate the eccentric die during the swaging operation. During use, the swage assembly is positioned such that the tooth to be swaged engages between the anvil and the die. The clamp lever is operated to rigidly hold the tooth into the swaging position, and then the die lever is operated to rotate the eccentric die thereby swaging the tooth. The swage assembly is then shifted to the next tooth to be swaged and the process is repeated. Obviously, a great deal of manual labor is required in order to swage each tooth of the saw. One such type of manual swage assembly is disclosed in U.S. Pat. No. 983,427.

Numerous automatic swage machines have been developed in an attempt to reduce operator fatigue in the swaging of the saw. One such automatic swage machine which has been widely accepted in the trade is disclosed in U.S. Pat. No. 2,800,039 issued to Vollmer. The Vollmer swage machine comprises a relatively complex machine which includes numerous gears and drive shafts which operate to correctly position the saw with respect to the swage assembly and to index the saw after each swaging operation. Unfortunately, the complexity of the Vollmer swage machine renders it too costly for a large number of swaging shops.

Therefore it is an object of this invention to provide an apparatus which overcomes the aforementioned inadequacies of the prior art devices and which provides an improvement which is a significant contribution to the advancement of the swage machine art.

Another object of this invention is to provide a swage machine which automatically swages each tooth of a saw.

Another object of this invention is to provide a swaging machine which is easily adjustable to swage the teeth of a variety of saws having different tooth spacings or different gauges.

Another object of this invention is to provide a swage machine which is relatively simple in construction so as to render it economical for most swage shops.

Another object of this invention is to provide a swage machine including an indexing mechanism which sequentially indexes the saw along a table to permit the swaging of the teeth of the saw.

Another object of this invention is to provide a swage machine including a swaging mechanism which automatically swages each tooth of the saw as the indexing mechanism moves the tooth to be swaged in engagement therewith.

The foregoing has outlined some of the more pertinent objects of the invention. These objects should be construed to be merely illustrative of some of the more prominent features in applications of the intended invention. Many other beneficial results can be obtained by applying the disclosed invention in a different manner or modifying the invention within the scope of the disclosure. Accordingly, other objects and the full understanding of the invention may be had by referring to the summary of the invention and the detailed description describing the preferred embodiment, in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises an automatic swage machine which swages the tip of each tooth of a saw such as a band saw or as a gang saw. More particularly, the swage machine of the invention comprises an indexing mechanism which indexes the saw along a table enabling a swaging mechanism to sequentially swage each tooth of the saw. The indexing mechanism comprises an indexing arm pivotably connected to the table. A motor and gear assembly drives a crank arm which operatively engages a slot in the indexing arm to pivot the indexing arm back and forth along the longitudinal length of the table. A pair of magnets are connected to the indexing arm for magnetic engagement with the saw. The magnets enable the indexing arm to pull the saw forwardly a distance appreciably greater than the distance between the teeth of the saw, and then push the saw rearwardly along the table a distance sufficient to engage the tooth to be swaged into the swaging mechanism. Upon engagement of the tooth in the swaging mechanism, the magnets slip with respect to the saw to permit the indexing arm to return to the completed position.

The swaging mechanism of the swage machine comprises a swage assembly which is rigidly secured to a carriage slidably disposed transversely within the table. A spring is provided for urging the carriage and correspondingly, the swage assembly toward the teeth of the saw. A pair of air cylinders are positioned above the saw to rigidly hold the saw into the swaging position after the tooth has engaged the swage assembly and during the swaging operation. A lever is pivotably connected to the die lever of the swage assembly for cooperation with a second crank arm connected to the drive shaft of the motor and gear assembly. Upon rotation of the drive shaft, a stub shaft extending from the crank arm cams against the end of the lever to operate the die lever of the swage assembly thereby swaging the tooth of the saw.

The relative angular positions of both of the crank arms are adjusted such that the swaging operation is performed only after the tooth to be swaged has engaged the swage assembly and the air cylinders have been actuated to rigidly hold the saw into the swaging position.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
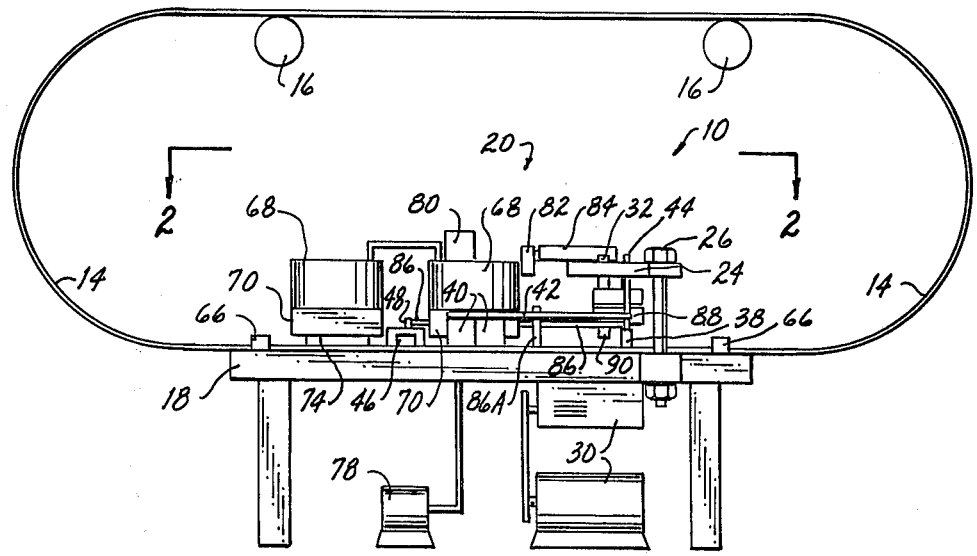
FIG. 1 is a frontal view of the automatic swage machine of the invention.

FIG. 1 is a frontal view of the automatic swage machine 10 of the invention. Basically, the swage machine 10 comprises an indexing mechanism 12 which circuitously moves the band saw 14 to be swaged between a pair of rollers 16 and table 18. The swage machine 10 further comprises a swaging mechanism 20 which individually swages each tooth 22 of the band saw 14 as the tooth 22 is moved into position by means of the indexing mechanism 12. It shall be understood that although the swage machine 10 is described as operating on a vertical plane as shown in the drawings, the swage machine 10 may alternatively operate on a horizontal plane in which the band saw 14 would move circuitously, edgewise, on the top of a wide table.

Indexing Mechanism

The indexing mechanism 12 of the swage machine 10 comprises an indexing arm 24 which is pivotably connected relative to the table 18 at pivot point 26. A crank arm 28 is operatively connected to a motor and gear assembly 30. A stub shaft 32 extends vertically from the end of the crank arm 28 for engagement within a slot 34 which extends longitudinally within the rearward portion of the indexing arm 24. The slot 34 comprises an enlarged substantially circular portion 36 located at the distal end thereof. In operation, rotation of the drive shaft 38 of the motor and gear assembly 30 causes the crank arm 28 to rotate about the drive shaft 38. Upon rotation of the crank arm 28, the stub shaft 32 slides within the slot 34 to force the indexing arm 24 to move from the completed position shown in FIG. 2, to the fully forward position shown in FIG. 3, and then to return to the completed position shown in FIG. 2. It is noted that circular portion 36 of the slot 34 permits the drive shaft 38 to continue to rotate an appreciable distance after the indexing arm 24 is moved to its completed position and before the indexing arm 24 begins to move forwardly.

As shown in FIG. 1, a pair of permanent magnets 40 are rigidly connected to a magnet arm 42 which is in turn pivotably connected to the indexing arm 24 at pivot point 44. The magnets 40 serve to magnetically engage the band saw 14 with the indexing arm 24 such that the band saw 14 is moved forwardly along the length of the table 18 as the indexing arm 24 moves from the position shown in FIG. 2 to that shown in FIG. 3. Then, as the indexing arm 24 moves from the fully forward position shown in FIG. 3 toward the position shown in FIG. 2, the band saw 14 is moved rearwardly along the length of the table 18 until the tooth 22 to be swaged engages the swaging mechanism 20. Upon engagement, further movement of the indexing arm 24 toward the position shown in FIG. 2 causes the magnets 40 to slide with respect to the band saw 14 to permit the indexing arm 24 to return to the position shown in FIG. 2. During the sliding of the magnets 40, the swaging mechanism 20 is actuated to swage the tooth 22. It is noted that a vacuum device may be substituted for the magnets 40 without departing from the spirit and scope of this invention. The vacuum device would operate substantially similar to the operation of the magnets 40 described above. After the swaging cycle is completed, the band saw 14 is again indexed forwardly along the table 18 and then moved slightly rearwardly to engage the succeeding tooth 22 into the swaging mechanism 20 for swaging. The process is repeated until all of the teeth 22 have been swaged. It should be appreciated that the indexing mechanism 12 of the swage machine 10 operates to sequentially engage each tooth 22 of the band saw 14 into the swaging mechanism 20.

Swaging Mechanism

Figure 4:
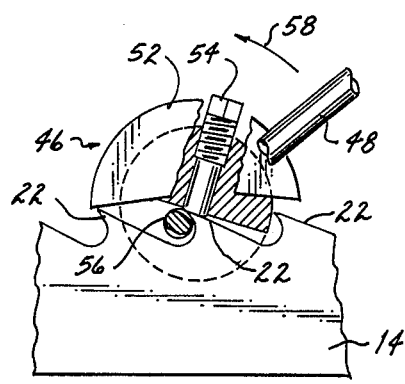
FIG. 4 is a cross-sectional view of a typical swage assembly illustrating the anvil, the die, and the die lever thereof.

The swaging mechanism 20 of the invention comprises a swage assembly 46 including a die lever 48 extending therefrom. As shown in FIG. 4, typical swage assemblies 46 comprise an anvil 50 secured into position in the housing 52 by means of an anvil holding screw 54. An eccentric die 56 is positioned beneath the engaging surface of the anvil 50 and is operatively connected to the die lever 48. In operation, the tooth 22 to be swaged is moved into position between the anvil 50 and the die 56. Rotation of the die lever 48 in the direction shown by arrow 58 causes the die 56 to also rotate, thereby swaging the tip of the tooth 22. It is noted that there exist many types of swage assemblies 46 which would be suitable to be used in the swage machine 10 of the invention. One type is manufactured by Armstrong Manufacturing Company, Portland, Oreg., and is described in their 1971 Catalog, at Section 12, pages 85–102B thereof, the disclosure of which is hereby incorporated by reference.

Figure 5:
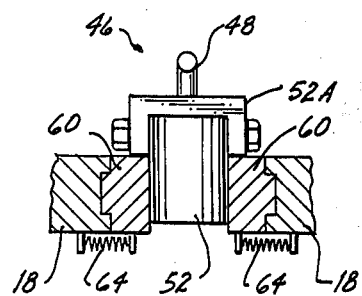
FIG. 5 is a cross-sectional view of FIG. 2 along lines 5—5 illustrating the manner in which the carriage moves transversely within the table of the swage machine.

The housing 52 of the swage assembly 46 is removably inserted into a hole in a carriage 60 which is slidably connected to the table 18 in a direction transverse to the longitudinal length of the saw 14. More specifically, as shown in FIG. 5, a carriage track 62 is formed transversely in the table 18, with the cross-sectional thereof corresponding to that of the carriage 60 so as to permit the carriage 60 to slidably engage therein. One or more springs 64 are connected to the table 18 and to the carriage 60 to urge the carriage 60 and correspondingly, the swage assembly 46 toward the saw 14 to engage the teeth 22 thereof. It is noted that the springs 64 may be eliminated when the swage machine 10 is operated on a vertical plane since the weight of the carriage 60 itself will urge the swage assembly 46 toward the saw 14 to engage the teeth 22 thereof. A collar 52A is secured to the housing 52 to position the swage assembly 46 in the carriage 60 such that the tooth receiving mouth of the swage assembly 46 is aligned with the upper surface of the table 18.

Figure 6:
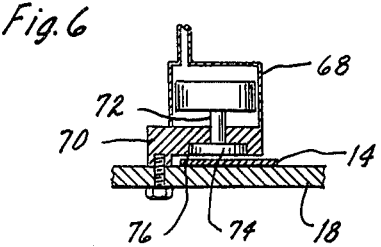
FIG. 6 is a cross-sectional view of FIG. 2 along lines 6—6 illustrating the manner in which the air cylinder rigidly secures the saw against the table.

The saw 14 is held into the swaging position by means of a pair of stops 66 which extend from the upper surface of the table 18 and by means of pair of air cylinders 68. More particularly, the cylinders 68 are positioned above the working surface of the table 18 by means of a pair of brackets 70. The inner shaft 72 of each of the cylinders 68 extend through a hole in the respective brackets 70 to engage the saw 14 thereby rigidly holding the saw 14 into position. As shown in FIG. 6, a foot member 74 may be connected to the terminal end of the shaft 72 to more rigidly hold the saw 14 into position upon actuation of the cylinders 68. A recess 76 is formed within each of the brackets 70 for receiving the foot member 74 during nonactuation of the cylinders 68.

Figure 2:
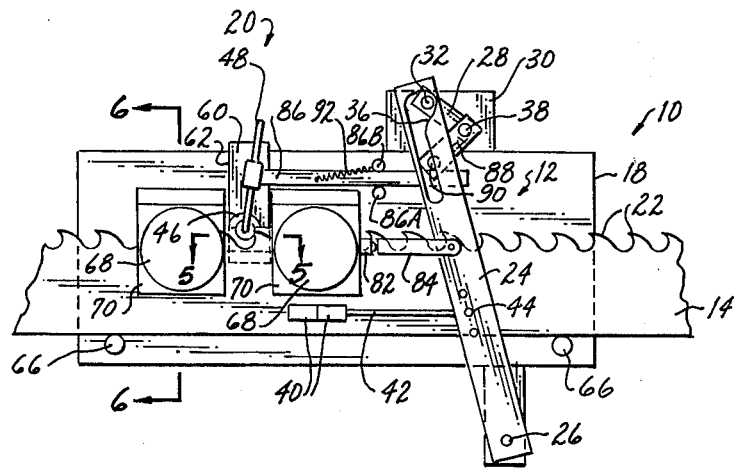
FIG. 2 is a partial top plan view of FIG. 1 along lines 2—2 illustrating the indexing arm of the indexing mechanism in a completed position at the completion of the rearward travel of the indexing arm and illustrating the crank arm of the swaging mechanism in a completed position at the completion of the swaging operation.
Figure 3:
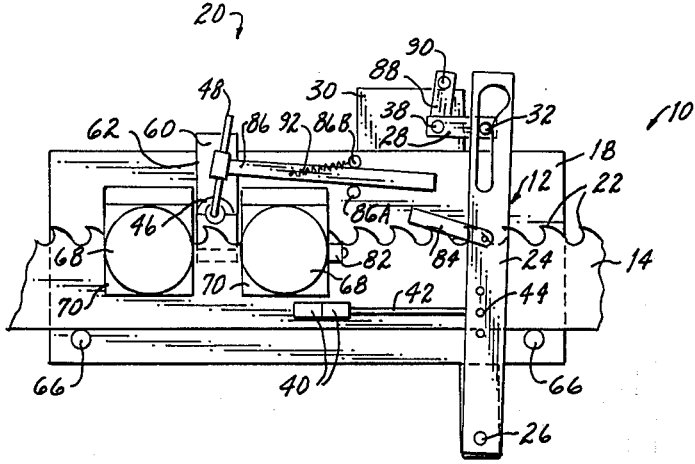
FIG. 3 is another partial top plan view of FIG. 1 illustrating the indexing arm in a fully extended forward position.

An air pump (compressor) 78 is provided for supplying air pressure to the cylinders 68. A solenoid valve 80 is connected in line with the output of the pump 78 to control the supply of air to the cylinders 68. An electrical switch 82 is connected to the solenoid valve 80 to control the operation thereof. Referring to FIGS. 2 and 3, it is seen that the switch 82 is connected to the side of one of the cylinders 68. A bracket 84 extends from the indexing arm 24 in alignment with the switch 82. The bracket 84 is made adjustable with respect to the indexing arm 24 so as to actuate the switch 82 after the tooth 22 has engaged the swage assembly 46 and immediately before the swaging operation begins.

Figure 7:
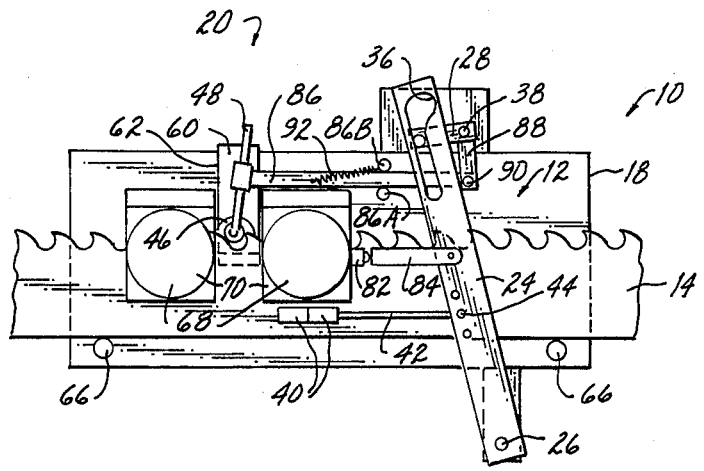
FIG. 7 is still another top plan view of FIG. 1 illustrating the crank arm of the swaging mechanism camming against the end of the lever connected to the die lever of the swage assembly to accomplish the swaging operation.

As shown in FIG. 7, a lever 86 is pivotably and adjustably connected to the die lever 48 of the swage assembly 46 and extends longitudinally along the length of the table 18 toward the motor and gear assembly 30 between a pair of upstanding guides 86A and 86B. A second crank arm 88 is rigidly connected to the drive shaft 38 of the motor and gear assembly 30 and includes a stub shaft 90 which extends downwardly from the distal end thereof. The lengths of the lever 86 and the crank arm 88 are selected such that the stub shaft 90 engages the end of lever 86 and pushes the lever 86 forwardly between guides 86A and 86B a distance sufficient to permit lever 86 to fully pivot die lever 48 through the swaging operation before the stub shaft 90 slips off of the end of lever 86. A spring 92 is connected to one of the guides 86A or 86B and the lever 86 to urge the lever 86 to return to its forward position thereby opening the swage assembly 46 for receiving the next tooth 22 to be swaged. It is noted that the relative angular positions of the first crank arm 28 and the second crank arm 88 with respect to one another is adjusted so as to enable the second stub shaft 90 to cam against the end of lever 86 immediately after the air cylinders 68 have been actuated to hold the saw 14 into the swaging position. Then, although the indexing arm 24 only moves further rearwardly a distance equal to the throw of the switch 82, the drive shaft 38 is permitted to continue rotating to enable the crank arm 88 to move the lever 86 a substantial distance (2 to 3 inches) rearwardly until the stub shaft 90 slips off of the end of lever 86. This is due to the fact that the circular portion 36 of the slot 34 of the indexing arm 24 permits the stub shaft 32 of the first crank arm 28 to move freely therein without causing forward movement of the indexing arm 24 and deactuation of the cylinders 68 until after the swaging operation is completed.

It should be appreciated that the swage machine 10 of the invention is designed to automatically and sequentially swage each tooth 22 of the saw 14. In order to install the saw 14 into the swage machine 10, the operator need only slip the saw 14 between the brackets 70 supporting the air cylinders 68 and the table 18, between the indexing arm 24 and the table 18, and over the rollers 16 positioned above the table 18. After turning on the air pump 78 and the motor and gear assembly 30, the saw 14 is indexed along the table 18 by the indexing mechanism 12 while the swaging mechanism 20 sequentially swages each tooth 22 of the saw 14.

The present disclosure includes that contained in the appended claims as well as that of the foregoing description. Although this invention has been described in its preferred form with a certain degree of particularity, it is understood that the present disclosure of the preferred from has been made only by way of example and that numerous changes in the details of construction and the combination and arrangement of parts may be resorted to without departing from the spirit and scope of the invention.

What is claimed is:

1. A swage machine for swaging the teeth of a saw, comprising in combination:
   a platform for receiving the saw;
   a swaging mechanism for swaging the tooth engaged therein;
   an indexing means for indexing the saw along the length of the platform and for moving the tooth to be swaged into an engaging position with the swaging mechanism; and
   said indexing means including a magnet means positioned for engagement with the saw to permit said indexing means to index the saw forwardly and then to move the saw rearwardly enabling the tooth to be swaged to engage said swaging mechanism.

2. The swage machine as set forth in claim 1, wherein said indexing means comprises in combination:
   an indexing arm pivotably connected relative to said platform;
   an elongated slot disposed within the rearward end of said indexing arm;
   a first crank arm having a first stub shaft extending therefrom for engagement within said slot; and
   means for rotating said first crank arm such that said first stub shaft slides within said slot to force said indexing arm forwardly and then rearwardly.

3. The swage machine as set forth in claim 2, wherein said swaging mechanism comprises in combination:

a swage assembly including a die lever;

means for rigidly holding the saw into the swaging position after the tooth to be swaged has engaged said swage assembly;

a lever pivotably connected to said die lever;

a second crank arm; and means for rotating said second crank arm such that said second crank arm engages said lever to sufficiently move said lever to pivot said die lever of said swage assembly thereby swaging the tooth engaged therein.

4. The swage machine as set forth in claim 3, wherein said second crank arm engages the end of said lever to move said lever.

5. The swage machine as set forth in claim 3, further comprising in combination:

both said rotating means comprising a rotatable drive shaft with both said crank arms being rigidly connected thereto;

said slot in said indexing arm including a substantially circular portion located at the distal end thereof, with the size of said circular portion being sufficient to permit movement of said first stub shaft therein after said indexing arm has moved fully rearwardly such that said indexing arm will remain substantially stationary in the rearward position during the swaging operation; and said first crank arm and said second crank arm being positioned relative to one another on said drive shaft such that said second crank arm engages said lever immediately after said holding means has been actuated to rigidly hold the tooth to be swaged into the swaging position.

6. The swage machine as set forth in claim 3, wherein said holding means comprises in combination:

an air cylinder mounted an appreciable distance above the saw positioned on said platform;

means for supplying air to said air cylinder;

valve means for controlling the supply of air to said air cylinder;

switch means for controlling the operation of said valve means; and means for actuating said switch means immediately before said second crank arm engages said lever.

7. The swage machine as set forth in claim 3, wherein said swaging mechanism further comprises means for urging said swage assembly toward the saw.

8. The swage machine as set forth in claim 7, wherein said means for urging said swage assembly toward the saw comprises in combination:

a carriage slidably disposed transverse to the length of the saw;

means for connecting said swage assembly to said carriage; and spring means for urging said carriage toward the saw such that said carriage resiliently moves away from the saw to permit the saw to be indexed forwardly by said indexing means, after which said carriage moves toward the saw to permit said indexing means to move the saw rearwardly to engage the tooth to be swaged into the swage assembly.

* * * * *